Figure 1:
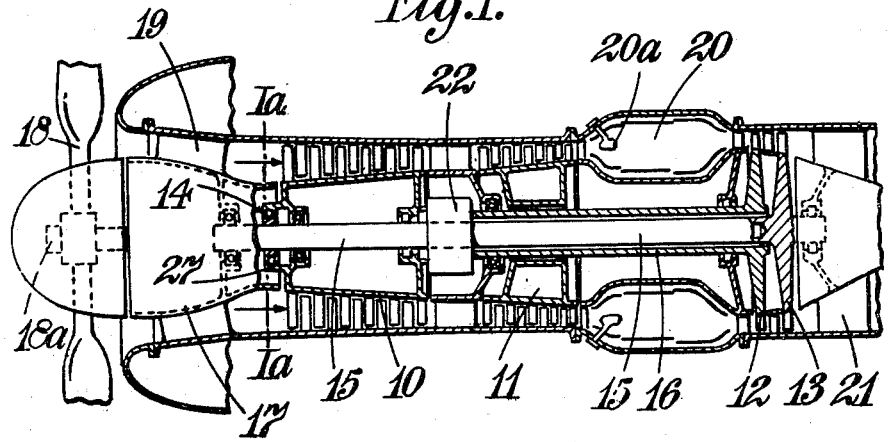

Aug. 2, 1960     L. HAWORTH     2,947,364

PROPELLER-DRIVING COMPOUND GAS-TURBINE ENGINE FOR AIRCRAFT

Filed Jan. 20, 1956     3 Sheets-Sheet 1

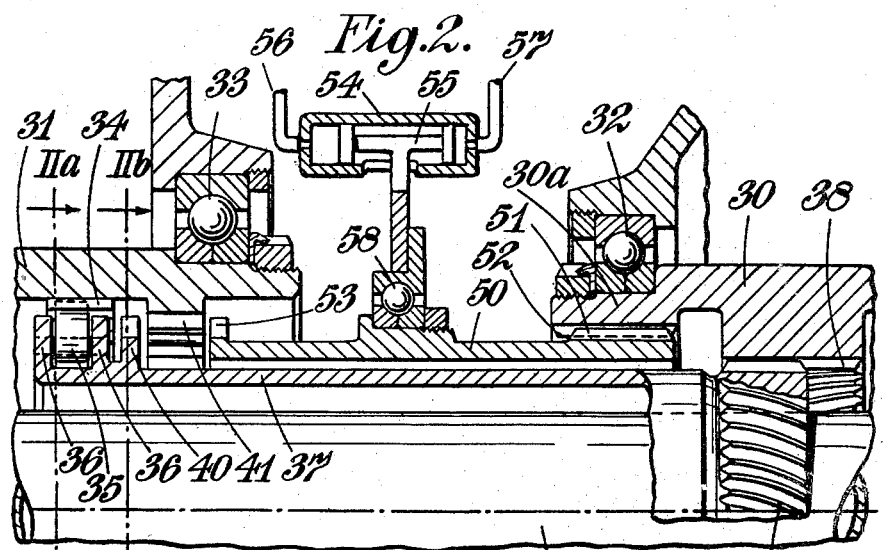
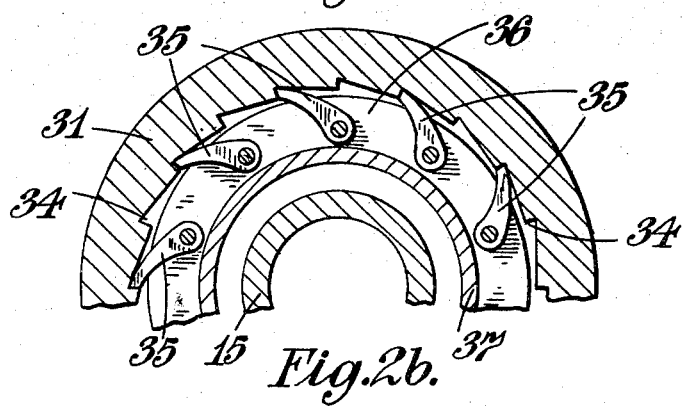
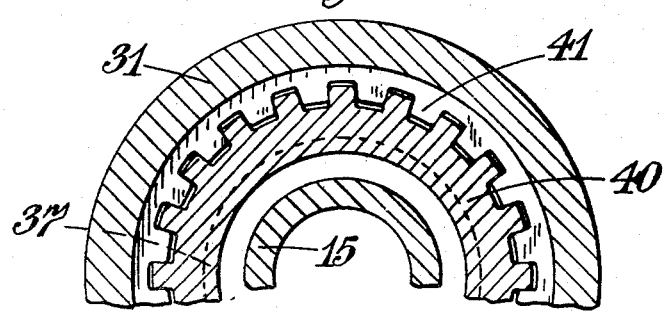

United States Patent Office
2,947,364
Patented Aug. 2, 1960

2,947,364

PROPELLER-DRIVING COMPOUND GAS-TURBINE ENGINE FOR AIRCRAFT

Lionel Haworth, Littleover, England, assignor to Rolls-Royce Limited, Derby, England, a British company Filed Jan. 20, 1956, Ser. No. 560,366

Claims priority, application Great Britain Jan. 25, 1955

3 Claims. (Cl. 170—135.71)

This invention relates to aircraft gas-turbine engines and is particularly concerned with engines of the type comprising independently rotatable low-pressure and high-pressure rotor systems, each comprising a corresponding compressor and compressor-driving turbine, in which the low-pressure compressor is connected to deliver at least in part to the high-pressure compressor, in which a low-pressure turbine is connected in series flow with the high-pressure turbine, and in which the low-pressure rotor system is additionally connected to drive an aircraft propeller. The term "propeller" as herein employed includes airscrews, helicopter rotors, or ducted fans. Such a gas-turbine engine will for the sake of convenience be referred to as a "compound propeller gas-turbine engine."

According to the present invention in a compound propeller gas-turbine engine, the turbine driving the low-pressure compressor is connected thereto through a freewheel or equivalent device adapted to permit the low-pressure compressor to overrun the low-pressure turbine, the propeller is permanently drivingly connected to the low-pressure turbine, and there is additionally provided a driving connection including clutching means for drivingly interconnecting the high-pressure compressor and low-pressure compressor.

Preferably the driving connection is adapted so that when a drive is established between the high-pressure and low-pressure compressors the two compressors rotate as one at the same speed, being driven by the high-pressure turbine system. If desired, however, the driving connection may be established to maintain a predetermined ratio of speeds between the two compressors. Likewise the freewheel connection between the low-pressure turbine system and the low-pressure compressor system is preferably adapted so that the low-pressure compressor overruns the low-pressure turbine when the ratio of the speed of the compressor to that of the turbine exceeds unity.

Aircraft gas-turbine engines in accordance with the present invention permit starting to be effected in the manner of the known form of compound propeller gas-turbine engine in which the airscrew is permanently connected to the low-pressure compressor and to the low-pressure turbine, and in which the low-pressure and high-pressure compressors are free for independent rotation under all running conditions. Thus with an engine of this invention in starting, the clutching means between the low-pressure compressor and the high-pressure compressor will be disengaged, and the passage of the heated working medium through the turbine system will rotate the high-pressure turbine and additionally the low-pressure turbine. Since in starting the low-pressure compressor is accelerated from the stationary state, it will be driven by the low-pressure turbine, together with the airscrew. As the engine is accelerated, a condition will be reached at which the low-pressure compressor reaches a rotational speed equal to or in a preselected ratio to the high-pressure compressor, and when this condition is reached the high-pressure and low-pressure compressors are drivingly interconnected through the driving connection by rendering the clutching means operative. Thereafter, the speed of the low-pressure turbine may fall below the speed of the combined compressor system or a preselected ratio of such speeds, and when this occurs the freewheel or equivalent device permits the drivingly connected compressors to overrun the low-pressure turbine which however drives the airscrew. Thus under cruise conditions the engine may function in the manner of a free power turbine engine, the low-pressure turbine solely driving the airscrew, and the high-pressure turbine driving the two compressors.

It will be appreciated that it is the usual practice to provide an airscrew of the variable pitch kind in which the pitch is controlled in known manner by a constant speed unit having a datum-speed-selecting device. The use of a variable pitch airscrew in engines according to the present invention permits the reduction of the power absorbed by the airscrew during starting and initial acceleration up to the condition where driving connection is established between the high-pressure compressor and the low-pressure compressor by engagement of the clutching means; likewise the rotational speed of the airscrew is controlled by the constant speed unit under conditions when the combined compressor system overruns the low-pressure turbine. It will thus be appreciated that a wide range of airscrew rotational speed and a wide range of power absorption by the airscrew are obtainable even though the actual rotational speed of the compressors is maintained at a high value and that the variation of power absorbed by the airscrew will be dependent upon the rate of fuel delivery to the combustion equipment of the engine and thus of the power generated by the low-pressure turbine by the passage of working medium.

Figure 1A:
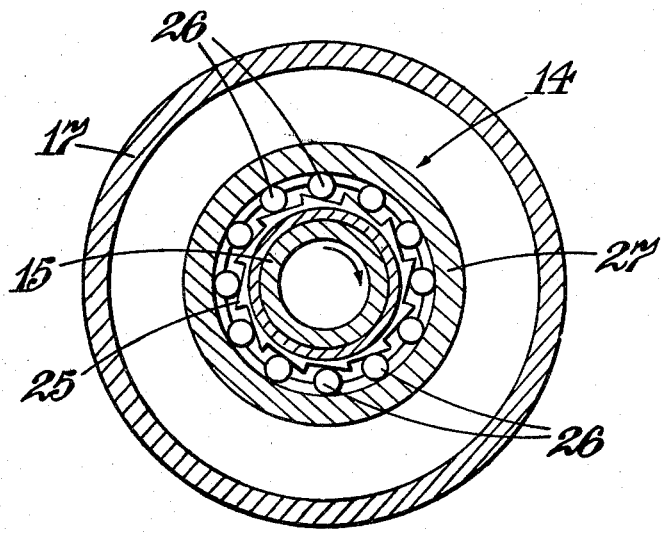
Figure 3:
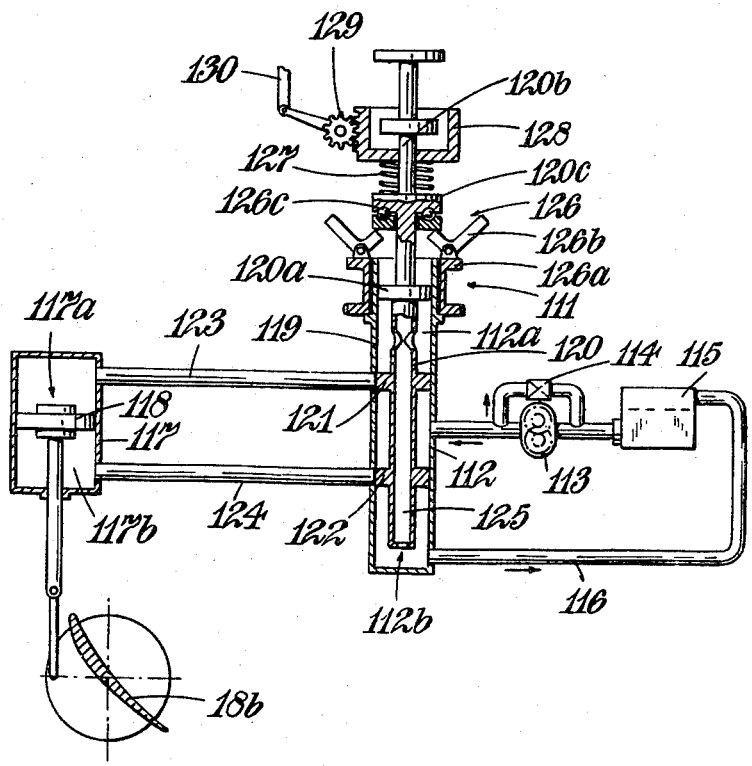

An embodiment of the invention is illustrated in the accompanying diagrammatic drawings in which:

Figure 1 is a sectional view of a compound propeller gas-turbine engine,

Figure 1a is a section on line Ia—Ia of Figure 1 to a larger scale showing the freewheel connection between the low-pressure turbine and the low-pressure compressor rotor, Figure 2 is a diagrammatic sectional view of a clutching means suitable for establishing a drive between the high-pressure and low-pressure compressor rotors, Figures 2a and 2b are respectively part-sectional views on lines IIa—IIa and IIb—IIb of Figure 2, Figure 3 illustrates a form of constant speed unit for a propeller.

Referring to Figure 1, the compound propeller gas-turbine engine illustrated comprises a low-pressure compressor 10 delivering to a high-pressure compressor 11 which is driven by a high-pressure turbine 12, and a low-pressure turbine 13 having a shaft 15 and arranged under certain operating conditions to drive the low-pressure compressor 10 through a freewheel device indicated at 14 and shown in greater detail in Figure 1a. The low-pressure turbine shaft 15 extends coaxially within shaft 16 of the high-pressure turbine. The shaft 16 is in permanent driving connection with the rotor of the high-pressure compressor 11. Shaft 15 extends through the low-pressure compressor rotor into a reduction gear housing 17 to drive gearing which is accommodated in the housing and through which an airscrew 18 is driven. The airscrew is of the variable pitch kind having pitch changing mechanism in the hub 18a. In accordance with the usual practice the airscrew pitch is controlled in known manner by a constant speed unit having a datum speed-selecting device. One conventional form of such constant speed unit is described below with reference to Figure 3. A drive connection including clutching means to establish driving connection between the high-pressure compressor 11 and low-pressure compressor 10 is indicated diagrammatically at 22.

Air enters the low-pressure compressor through the annular duct 19 surrounding the reduction gear housing 17 and is delivered by the high-pressure compressor to combustion equipment 20 into which liquid fuel is introduced by fuel nozzles 20a, the products of combustion passing through the turbine 12 and 13 in series flow to an exhaust duct 21.

Referring now to Figure 1a it will be seen that the shaft 15 is connected with the rotor of the low-pressure compressor 10 by means of a one-way clutch which permits shaft 15 to drive the compressor rotor and permits the compressor rotor to over-run the shaft 15. The one-way clutch comprises ramp formations 25 on the low-pressure turbine shaft 15 co-operating with roller elements 26 which are accommodated within an internally cylindrical extension 27 of the forward end of the rotor and the low-pressure compressor 10. If it is assumed that the low-pressure rotor is stationary and the low-pressure turbine shaft 15 begins to rotate in the clockwise direction as viewed in Figure 1a, the rollers 26 will ride up the ramp formations 25 and establish a driving connection between the shaft 15 and the low-pressure compressor rotor. However, the low-pressure compressor rotor can overrun the shaft 15 if the compressor is driven at a higher speed than the shaft 15, since the rollers 26 will move down the ramp formations 25 so preventing transmission of a drive from shaft 15 to the compressor.

Referring now to the Figures 2, 2a and 2b, there is illustrated one form of the driving connection 22 incorporating a clutching device of a generally known type suitable for establishing a drive between the high-pressure and low-pressure compressors. The high-pressure compressor shaft 16 has a part which extends beyond the entry end of the high-pressure compressor and is indicated at 30, and the low-pressure compressor rotor has at its delivery end a rearward extension 31. The shaft part 30 is shown to be borne in stationary structure by a bearing arrangement 32, and the low-pressure rotor extension 31 is supported in bearing 33. The low-pressure turbine shaft 15 extends through the whole assembly.

As will be seen with particular reference to Figures 2 and 2a, the shaft 31 is formed internally with ratchet teeth 34 arranged to be engaged by pawls 35 which are pivotally mounted in flange formations 36 on a sleeve 37. The sleeve 37 extends into the shaft part 30 and rotor extension 31, and is engaged through helical splines 39 with helical splines 38 internally of the shaft part 30. In addition, as more clearly shown in Figure 2b, the sleeve 37 is formed with a dog-toothed flange 40 arranged to co-operate with internal dog-tooth formations 41 on the rotor extension 31.

If the high-pressure shaft part 30 is rotating at a speed in excess of that of the low-pressure rotor extension 31, and both shafts are rotating in the clockwise direction as viewed from the left-hand side of Figure 2, the pawls 35 which are centrifugally loaded to move radially outwards will override the ratchet teeth 34 on the low-pressure rotor extension 31 since the sleeve 37 which carries the pawls is drivingly connected with the shaft 30 through the splines 38 and 39.

If, however, the speed of the low-pressure rotor tends to exceed that of the high-pressure shaft, the pawls 35 will be engaged by the ratchet teeth and excess rotational speed of the low-pressure compressor rotor over the high-pressure shaft will cause relative rotation of the sleeve 37 and shaft part 30, whereby the sleeve 37 will be caused to move to the right through the helical spline 38 and 39. The angular positions of the pawls on the sleeve 37 and of the ratchet teeth 34, are chosen with respect to the angular positions of the teeth 40 and 41, so that, when sleeve 37 and shaft part 30 are locked with respect to the rotor extension 31 by the pawl and ratchet mechanism, the teeth 40, 41 are aligned, and so that axial movement of the sleeve 37 to the right causes the teeth 40, 41 to move into engagement. The axial movement of the sleeve 37 to the right is limited by the flange 36 on the right-hand side of the pawls 35 coming into abutment with the teeth 41. A driving connection is established between the parts 30, 31 when the teeth 40, 41 are engaged.

It will be noted, however, that with the arrangement so far described the teeth 40, 41 will be disengaged if the low-pressure compressor rotor now tends to rotate at a speed less than that of the high-pressure rotor shaft.

In order to establish a positive driving connection between the high-pressure rotor and the low-pressure compressor, that is a drive connection which is maintained even though the low-pressure rotor speed tends to fall below that of the high-pressure rotor, a secondary selectively-operable clutch is provided which comprises a sleeve 50, which is coaxially outside the sleeve 37 and has at one end external straight splines 51 co-operating with internal splines 52 on an extension 30a of the shaft part 30, and has at its left-hand end dog-teeth 53 adapted to engage the teeth 41. It will be understood that engagement of the teeth 40, 41 establishes a predetermined angular relationship between the parts 30 and 31, such that axial movement of the sleeve 50 can be effected to establish engagement of the dog-teeth 53 with the teeth 41.

Axial movement of the sleeve 50 is controlled by one or more hydraulic piston and cylinder devices, the cylinder of one of which is shown at 54 containing a double piston at 55. Hydraulic pressure fluid is supplied selectively to one end or the other of the cylinder 54 through pipe connections 56 and 57. Axial movement of the piston assembly 55 within the cylinder 54 is transmitted through a thrust bearing 58 to the sleeve 50. When more than one piston and cylinder device 54, 55 is employed, they will be spaced around the thrust ring 58 to provide a distributed thrust on the sleeve 50.

A driving connection as described may be incorporated in the engine shown in Figure 1 at 22.

In the operation of the engine described, the clutch means between the low-pressure compressor and the high-pressure rotor is disengaged for starting purposes. Thus the engine starts as a normal compound engine in which the high-pressure turbine and compressor accelerates faster than the low-pressure turbine system which drives the low-pressure compressor and the airscrew. After starting and during subsequent acceleration of the engine by increase of the fuel supply and by appropriate choice of the speed datum setting on the airscrew, the speed of the low-pressure compressor system can be caused to reach that of the high-pressure system. The mechanism described in Figures 2, 2a and 2b then becomes effective to establish driving connection between the two compressor systems. Thereafter by supplying hydraulic pressure fluid through the pipeline 57 to the cylinder 54, a positive driving connection is established between the two compressor rotors.

Thereafter the speed of the low-pressure turbine can be controlled by the variable pitch airscrew speed-setting mechanism to rotate at a speed less than that of the high-pressure turbine and the two compressors driven thereby. When the shaft 15 is rotating at a speed less than that of the shaft 16 the freewheel device indicated at 14 in Figure 1 permits the low-pressure compressor to overrun the shaft 15 of the low-pressure turbine.

Certain operational advantages may be obtained from an engine constructed in accordance with the present invention; first, a wide range of airscrew speeds can be employed permitting low cruising airscrew speeds, thereby reducing the airscrew noise; secondly, since the low-pressure and high-pressure compressors act as a single-shaft compressor in normal operation, the two sections can be matched over a wide range of speed, thus avoiding difficulties which occur where the low-pressure compressor speed is dependent upon the airscrew speed; thirdly, the airscrew and low-pressure turbine cannot overrun the high-pressure turbine when the clutching means is engaged, and thus the possibility of overspeeding of the low-pressure turbine when the power plant is operating as a free turbine engine is avoided.

Conveniently the clutch mechanism for establishing a positive driving connection between the low-pressure compressor and the high-pressure rotors is under the control of the operator at least in the sense of engagement. Thus, when the synchronising clutch has established driving engagement, the operator initiates the supply of hydraulic pressure fluid to the cylinder 54 through the pipeline 57. Disengagement of the positive driving connection may be effected automatically, for example on landing of the aircraft, by means of an electrical circuit energised when the undercarriage is loaded. Alternatively, speed-sensitive means operative after driving connection has been established by the synchronising clutch may be used both to engage and disengage the clutch 50, 51, 52, 53, 41 at preselected rotational speeds of the combined rotor system.

Referring to Figure 3, there is shown diagrammatically a conventional form of constant speed unit for controlling the rotational speed of the propeller 18 at a selected value.

The propeller blades 18b are adjusted in pitch by being connected to a ram piston 118 working in a ram cylinder 117, pressure fluid being supplied to the cylinder space 117a by pipe 123 to coarsen the pitch of the blades and to the space 117b to fine off the propeller blades.

Pressure liquid is drawn from tank 115 by pump 113 and is delivered through a valve 111 to the pipes 123, 124 according to the setting of the valve 111. A by-pass containing a pressure relief valve 114 is provided around pump 113 to maintain a constant delivery pressure. A return pipe 116 leads from valve 111 to the tank 115.

The valve 111 comprises a valve body 112 and a piston valve element 120 slidable in the body. The element 120 has lands 121, 122, which in a neutral position of the element 120 cover the ends of the pipes 123, 124, and has a central bore 125 joining space 112a between land 120a and the land 121 with end space 112b into which return pipe 116 opens.

The element 120 has an upward extension 120b having a flange 120c on which bears a spring 127 having an adjustable abutment 128 the position of which is varied by pinion 129 rotatable manually by linkage 130. The position of abutment 128 determines the load applied by spring 127 to the valve element 120 and thus the selected rotational speed.

The element 120 is loaded in opposition to the spring 127 by a speed responsive device 126 comprising a rotatable element 126a driven at a speed proportional to the propeller speed and fly-bobs 126b which bear on the flange 120c through thrust bearing 126c. As the speed of rotation of element 126a increases so the device 126 tends to lift the valve element 120 against the load of spring 127.

Assume that the propeller 18 is rotating at the datum speed selected by adjustment of abutment 128, and that an unwanted increase of this speed occurs. Valve element 120 is lifted from its neutral position and pressure liquid is fed by pipe 123 to space 117a so coarsening the propeller blade pitch and causing the rotational speed to fall. On the other hand, if there is an unwanted fall of speed, spring 127 overcomes the load due to the device 126 and the valve element 120 is lowered from the neutral position so allowing pressure liquid to enter space 117b to fine off the blade pitch and to allow the propeller speed to increase.

I claim:

1. A compound propeller gas-turbine engine comprising in flow series a low-pressure compressor, a high-pressure compressor, a high-pressure turbine, the high-pressure compressor and high-pressure turbine being in permanent driving connection, and a low-pressure turbine; a propeller, the propeller and low-pressure turbine being in permanent driving connection; a one-way clutch connection between the low-pressure turbine and the low-pressure compressor permitting the low-pressure turbine to drive the low-pressure compressor and permitting the low-pressure compressor to over-run the low-pressure turbine; and a driving connection interconnecting the high-pressure compressor and the low-pressure compressor, said driving connection including clutching means permitting the driving connection to be rendered operative and inoperative.

2. A compound propeller gas-turbine engine as claimed in claim 1, wherein the propeller is a variable-pitch propeller and there is provided a constant speed unit maintaining the rotational speed of the propeller at a selected value by varying the pitch of the propeller and including a datum-speed selecting device adjustable to select the rotational speed at which the propeller speed is maintained.

3. A compound propeller gas-turbine engine as claimed in claim 1, wherein the clutching means comprises a first clutch mechanism automatically engageable to drivingly connect the compressors as the rotational speed of the low-pressure compressor tends to exceed a value having a selected ratio to the speed of the high-pressure compressor, and a second clutch mechanism engageable, when the first clutch mechanism is engaged, positively to drivingly interconnect the two compressors.

References Cited in the file of this patent

UNITED STATES PATENTS

| | | |
|---|---|---|
| 2,571,848 | Ehlers | Oct. 16, 1951 |
| 2,619,797 | Haworth | Dec. 2, 1952 |
| 2,645,412 | Sens | July 14, 1953 |
| 2,667,228 | Wood et al. | Jan. 26, 1954 |
| 2,683,493 | Grinyer | July 13, 1954 |